United States Patent
Kim et al.

(10) Patent No.: US 8,690,422 B2
(45) Date of Patent: Apr. 8, 2014

(54) METHOD FOR MEASURING TEMPERATURE OF MOTOR FOR HYBRID ELECTRIC VEHICLE

(75) Inventors: Chul Woo Kim, Gyeonggi-do (KR); Bum Sik Kim, Gyeonggi-do (KR); Tae Hwan Chung, Gyeonggi-do (KR); Young Kook Lee, Seoul (KR); Jin Hwan Jung, Gyeonggi-do (KR); Sang Hyeon Moon, Gyeonggi-do (KR); Sung Kyu Kim, Gyeonggi-do (KR); Jae Won Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 911 days.

(21) Appl. No.: 12/796,744

(22) Filed: Jun. 9, 2010

(65) Prior Publication Data

US 2011/0134959 A1    Jun. 9, 2011

(30) Foreign Application Priority Data

Dec. 3, 2009  (KR) .................. 10-2009-0118897

(51) Int. Cl.
   *G01K 13/02* (2006.01)
(52) U.S. Cl.
   USPC ........................................... 374/144
(58) Field of Classification Search
   None
   See application file for complete search history.

(56) References Cited

U.S. PATENT DOCUMENTS

| | | | | |
|---|---|---|---|---|
| 5,396,161 A | * | 3/1995 | Doi et al. ............... | 318/807 |
| 5,764,246 A | * | 6/1998 | Wataya et al. .......... | 347/14 |
| 5,902,925 A | * | 5/1999 | Crispie et al. .......... | 73/1.88 |
| 5,995,033 A | * | 11/1999 | Roeckner et al. ....... | 341/155 |
| 6,433,615 B2 | * | 8/2002 | Nagano et al. .......... | 327/513 |
| 7,322,743 B2 | * | 1/2008 | Gozloo et al. .......... | 374/170 |
| 7,398,173 B2 | * | 7/2008 | Laraia et al. ........... | 702/99 |
| 7,772,791 B2 | * | 8/2010 | Lim et al. ............... | 318/432 |
| 7,843,185 B2 | * | 11/2010 | Berry et al. ............. | 323/283 |
| 2007/0252548 A1 | * | 11/2007 | Moon et al. ............. | 318/434 |
| 2008/0270062 A1 | * | 10/2008 | Laraia et al. ........... | 702/104 |

FOREIGN PATENT DOCUMENTS

| | | |
|---|---|---|
| JP | 2007-187559 A | 7/2007 |
| JP | 2009-014386 A | 1/2009 |
| JP | 2009-068895 A | 4/2009 |
| KR | 20-1992-0008201 | 5/1992 |
| KR | 20-1993-001639 | 1/1993 |
| KR | 10-2008-0083825 A | 9/2008 |

* cited by examiner

*Primary Examiner* — Lisa Caputo
*Assistant Examiner* — Nasir U Ahmed
(74) *Attorney, Agent, or Firm* — Edwards Wildman Palmer LLP; Peter F. Corless

(57) ABSTRACT

The present invention provides a method for measuring the temperature of a motor for a hybrid electric vehicle. In preferred embodiments, the method of the present invention can preferably ensure the stability and reliability of motor control by extending the linearity of a temperature sensor attached to the motor within a required measurement range. The present invention preferably provides a method for measuring the temperature of a motor for a hybrid electric vehicle, in which a required measurement range of motor temperature is divided into high and low temperature ranges and a hardware gain circuit is divided into first and second gain blocks such that the first gain block measures the temperature of the high temperature range and the second gain block measures the temperature of the low temperature range.

2 Claims, 4 Drawing Sheets

METHOD FOR MEASURING TEMPERATURE OF MOTOR FOR HYBRID ELECTRIC VEHICLE

CROSS-REFERENCE TO RELATED APPLICATION

This application claims under 35 U.S.C. §119(a) the benefit of Korean Patent Application No. 10-2009-0118897 filed Dec. 3, 2009, the entire contents of which are incorporated herein by reference.

BACKGROUND (a) Technical Field

The present disclosure relates, generally, to a method for measuring the temperature of a motor. More particularly, it relates to a method for measuring the temperature of a motor for a hybrid electric vehicle, which can suitably extend the measurement range of motor temperature within a required measurement range and improve the linearity of a temperature sensor.

(b) Background Art

Gasoline and diesel engines that use fossil fuel can have a number of problems such as environmental contamination due to exhaust gas, global warming due to carbon dioxide, respiratory ailments due to increased ozone, etc. Further, since the amount of fossil fuel left on the earth is limited, it will be exhausted in the near future.

Accordingly, various types of environmentally-friendly electric vehicles, such as a pure electric vehicle (EV) driven by a motor (hereinafter referred to as a drive motor), a hybrid electric vehicle (HEV) driven by an engine and a drive motor, a fuel cell electric vehicle (FCEV) driven by a drive motor which is powered electric power generated by a fuel cell, etc., have been developed.

The electric vehicle includes a drive motor for driving the vehicle, a battery as an energy storage device for supplying electric power to the drive motor, and an inverter for driving the drive motor.

The battery that supplies electric power to the drive motor in the electric vehicle is referred to as a high voltage battery (or main battery), which is distinguished from a low voltage battery (or auxiliary battery) that supplies low power to electronic components, and is repeatedly charged and discharged during running of the vehicle to supply necessary power to the drive motor. The inverter inverts the phase of electric power supplied from the battery according to a control signal suitably applied from a controller to operate the drive motor.

Further, the temperature of a specific component is suitably measured and the measured temperature is used to monitor the current status of the corresponding component and to control its related components and system.

For example, the temperature of the motor is suitably measured by a temperature sensor such that when the temperature is low, an inverter corrects the physical properties in which the output of the motor is suitably reduced, and when the temperature is high, the motor is controlled to prevent dielectric breakdown and deterioration of durability due to the overheat.

The temperature sensors mounted in a hybrid electric vehicle are classified into negative thermal coefficient (NTC) sensors and positive thermal coefficient (PTC) sensors. For example, as shown in FIG. 1, the resistance value of the NTC or PTC sensor is suitably converted into a voltage value by a hardware gain circuit 12 to measure the temperature of the motor.

Here, although the required measurement range of the motor temperature is −40 to 200° C., the entire temperature range required is suitably measured, and the sensor having the circuit linearity is not physically present. Therefore, it is necessary to use two types of sensors such as a temperature sensor having the linearity at a temperature of −40° C. and a temperature sensor having the linearity at a temperature of 200° C.

However, the use of the two types of motor temperature sensors in the hybrid electric vehicle increases the manufacturing cost and the number of components to be replaced in the event of failure.

Further, the motor temperature sensors cannot satisfy the linearity in the entire temperature range required by the vehicle, and thus a specific temperature range is linearized and measured.

Typically, the prevention of dielectric breakdown due to overheat of the motor is more important than the prevention of reduction of output, and therefore, as shown in FIG. 2, the temperature of the motor is suitably measured by a hardware gain circuit with respect to the temperature range of 40 to 200° C.

However, it is difficult to use precise information at both high and low temperatures at the same time, and further the stability and reliability of motor control are suitably reduced due to a deviation of the temperature sensor of the motor at a low temperature.

Further, conventionally, a high precision element is used to overcome the above-described problems, which suitably increases the manufacturing cost and the time and effort required to perform a verification test.

Accordingly, there remains a need in the art for methods of measuring the temperature of a motor for a hybrid electric vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention, in certain preferred aspects, provides a method for measuring the temperature of a motor for a hybrid electric vehicle, which can suitably improve the stability and reliability of motor control by extending the measurement range of motor temperature within a required measurement range without the use of two types of temperature sensors.

In a preferred embodiment, the present invention provides a method for measuring the temperature of a motor for a hybrid electric vehicle, the method including measuring the temperature of a motor by first and second gain blocks; determining whether the measured temperature of the motor is within a low temperature range or a high temperature range; and measuring the temperature of the low temperature range by the second gain block if the measured temperature of the motor is within the low temperature range, and measuring the temperature of the high temperature range by the first gain block if the measured temperature of the motor is within the high temperature range.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
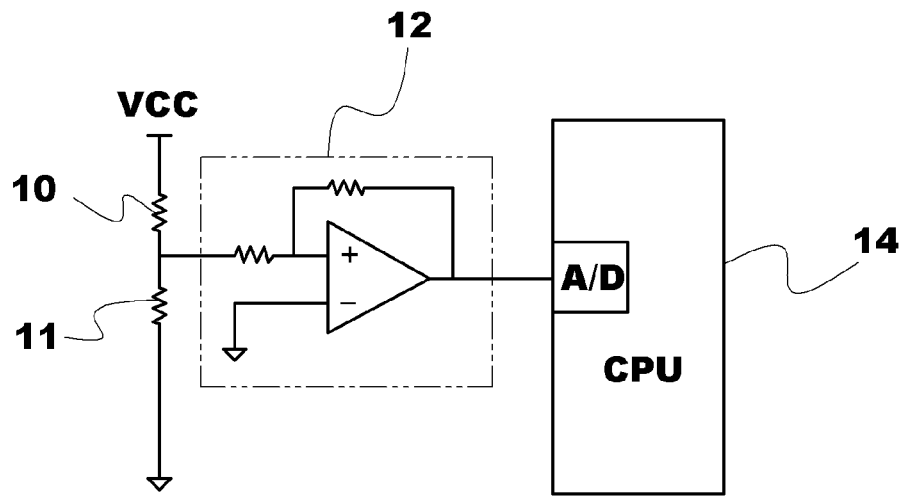
FIG. 1 is a circuit diagram of a motor temperature sensor applied to a conventional hybrid electric vehicle.
Figure 2:
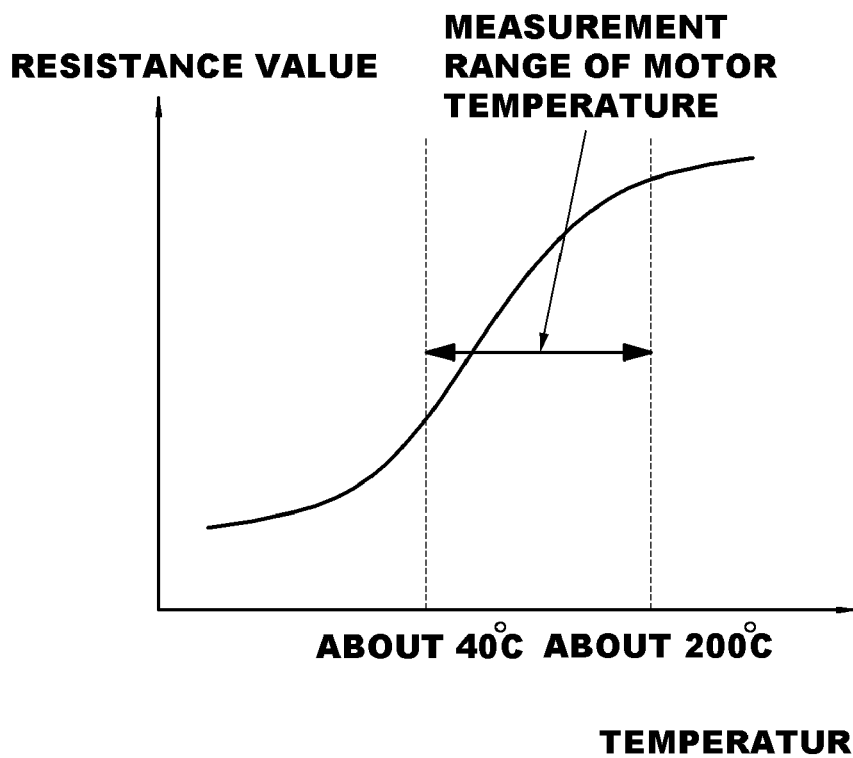
FIG. 2 is a graph showing a characteristic curve of a motor temperature sensor applied to a conventional hybrid electric vehicle.

Reference numerals set forth in the Drawings includes reference to the following elements as further discussed below:

| 10: gain circuit | 11: temperature sensor |
|---|---|
| 110: first gain block | 120: second gain block |
| 14: CPU | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In one aspect, the present invention features a method for measuring the temperature of a motor for a hybrid electric vehicle, the method comprising measuring the temperature of a motor by first and second gain blocks, determining whether the measured temperature of the motor is within a low temperature range or a high temperature range.

In one embodiment, the method further comprises measuring the temperature of the low temperature range by the second gain block if the measured temperature of the motor is within the low temperature range, and measuring the temperature of the high temperature range by the first gain block if the measured temperature of the motor is within the high temperature range.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
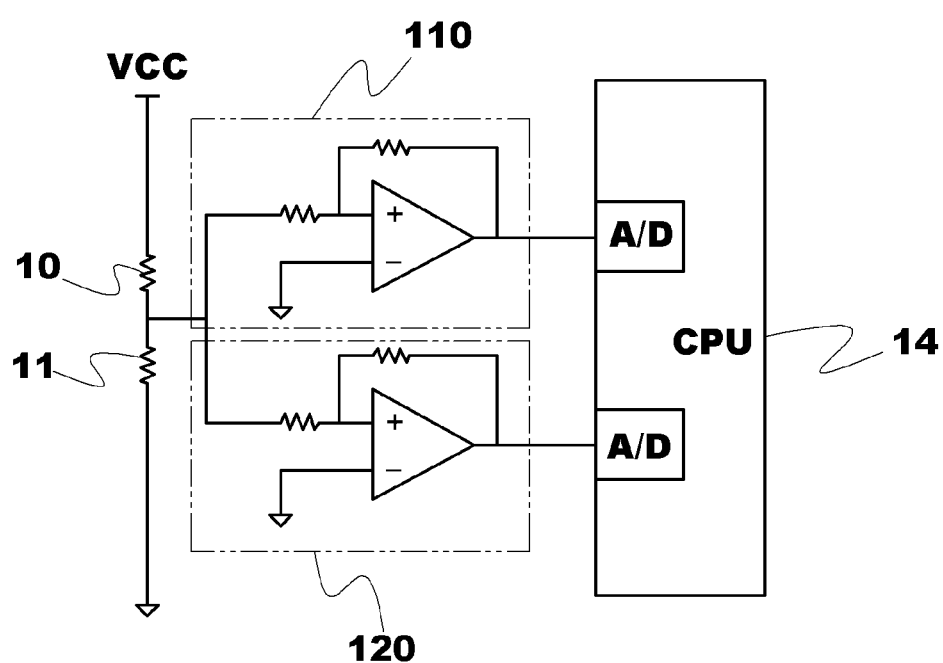
FIG. 3 is a circuit diagram of a motor temperature sensor in accordance with an exemplary embodiment of the present invention.
Figure 4:
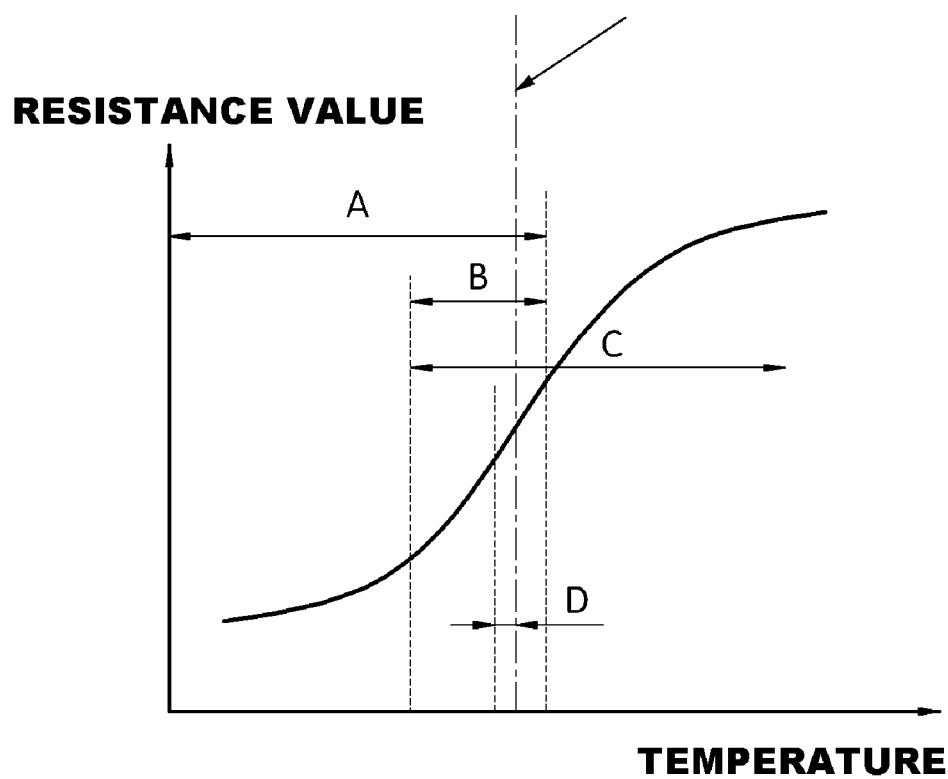
FIG. 4 is a graph showing a characteristic curve of a motor temperature sensor in accordance with an exemplary embodiment of the present invention.
Figure 5:
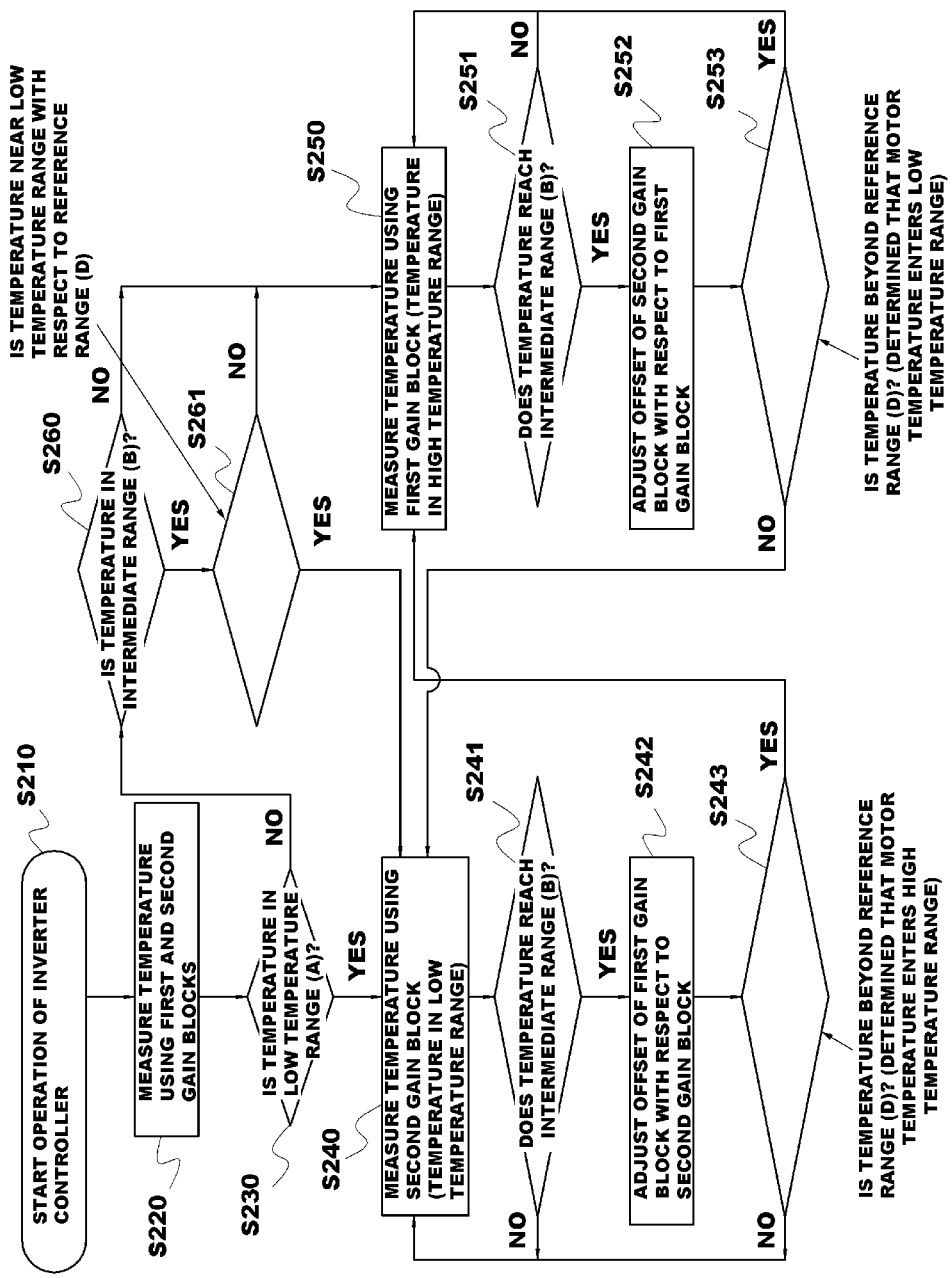
FIG. 5 is a flowchart illustrating an exemplary method for measuring the temperature of a motor for a hybrid electric vehicle.

FIG. 3 is a circuit diagram of a motor temperature sensor in accordance with an exemplary embodiment of the present invention. FIG. 4 is a graph showing a characteristic curve of the motor temperature sensor of FIG. 3. FIG. 5 is a flowchart illustrating a method for measuring the temperature of a motor for a hybrid electric vehicle.

According to preferred embodiments, the present invention provides a method for measuring the temperature of a motor for a hybrid electric vehicle, in which the entire temperature range of the motor to be measured is suitably divided into two ranges and a hardware gain circuit is suitably divided into two gain blocks such that each gain block measures the temperature of the corresponding temperature range, thus ensuring the maximum linearity.

According to certain preferred embodiments, the entire temperature range of the motor to be measured is suitably divided into a high temperature range (C), a low temperature range (A), and an intermediate range (B), in which the high temperature range (C) and the low temperature range (A) overlap each other.

For example, in certain exemplary embodiments, the high temperature range (C) may be $t_1$ to 200° C., the intermediate range (B) may be $t_1$ to $t_2$ ($t_2 > t_1$)° C., and the low temperature range (A) may be −40 to $t_2$° C.

Preferably, in further preferred embodiments, the gain circuit includes a first gain block 110 and a second gain block 120. Preferably, the first gain block 110 covers the high temperature range (C) to suitably convert the resistance value of the temperature measured by a temperature sensor 11 into a voltage value, and the second gain block 120 covers the low temperature range (A) to suitably convert the resistance value of the temperature measured by the temperature sensor 11 into a voltage value.

Accordingly, the present invention does not employ different types of temperature sensors but suitably divides the hardware gain circuit into the first and second gain blocks 110 and 120 to cover the high temperature range (C) and the low temperature range (A), respectively, thus ensuring the linearity of the temperature sensor in the entire temperature range of the motor.

According to further preferred embodiments of the present invention, in order to optimize the linearity and correct the deviation in the intermediate range (B), in which the high temperature range (C) and the low temperature range (A) overlap each other, the deviation is suitably corrected with respect to the temperature measured from the time at which the inverter power is input.

For example, in certain exemplary embodiments, if the starting point of the temperature measurement is in the low temperature range (A), where the temperature is raised, a CPU 14 corrects the offset and linearity of the high temperature range (C) of a temperature value input to the CPU 14 with respect to an input value of the low temperature range (A). In other further exemplary embodiments, if the starting point of the temperature measurement is in the high temperature range (C where the temperature falls), the CPU 14 corrects the offset and linearity of the low temperature range (A) of a temperature value input to the CPU 14 with respect to an input value of the high temperature range (C).

A method for measuring the temperature of a motor for a hybrid electric vehicle in accordance with further exemplary embodiments of the present invention is described herein.

In a preferred exemplary embodiment, the operation of an inverter controller is suitably started (S210), and the temperature of the motor is suitably measured by the first and second gain blocks 110 and 120 (S220).

Then, in a further preferred embodiment, it is suitably determined whether the starting point of the temperature measurement of the temperature sensor 11 is in the low temperature range (A) (S230).

Preferably, if the starting point of the temperature measurement of the temperature sensor 11 is in the low temperature range (A), the temperature of the low temperature range (A) is suitably measured by the second gain block 120 (S240), whereas if the starting point of the temperature measurement of the temperature sensor 11 is in the high temperature range (C), the temperature of the high temperature range (C) is suitably measured by the first gain block 110 (S250).

Preferably, if the starting point of the temperature measurement of the temperature sensor 11 is in the intermediate range (B) (S260), it is suitably determined whether the starting point of the temperature measurement of the temperature sensor 11 is near the low temperature range (A), i.e., $t_1$, with respect to the temperature of a reference range (D, $t_1<D<t_2$), which is a determination reference during offset adjustment (S261).

In other further embodiments, if the starting point of the temperature measurement of the temperature sensor 11 is near the low temperature range (A) with respect to the temperature of the reference range (D), the temperature of the low temperature range (A) is suitably measured by the second gain block 120 (S240), whereas if the starting point of the temperature measurement of the temperature sensor 11 is near the high temperature range (C) with respect to the temperature of the reference range (D), the temperature of the high temperature range (C) is suitably measured by the first gain block 110 (S250).

In other further preferred embodiments, it is determined whether the temperature measured by the second gain block 120 reaches the intermediate range (B) during the temperature measurement in the low temperature range (A) (S241), and if the measured temperature reaches the intermediate range (B), the offset of the first gain block 110 is suitably adjusted with respect to the second gain block 120 (S242).

According to further preferred embodiments, after the offset adjustment of the first gain block 110, it is suitably determined whether the motor temperature enters the high temperature range (C) by determining whether the temperature measured by the second gain block 120 is beyond the reference range (D) as the determination reference during offset adjustment (S243).

Preferably, if the temperature measured by the second gain block 120 is beyond the reference range (D), it is suitably determined that the motor temperature enters the high temperature range (C), the temperature of the high temperature range (C) is measured by the first gain block 110, and steps S251 to S253 are repeated.

In other exemplary embodiments, if the temperature measured by the second gain block 120 is suitably below the reference range (D), it is determined that the motor temperature is within the low temperature range (A), and steps S240 to S243 are repeated.

According to other embodiments of the present invention, it is suitably determined whether the temperature measured by the first gain block 110 reaches the intermediate range (B) (S251), and if the temperature measured by the first gain block 110 reaches the intermediate range (B), the offset of the second gain block 120 is adjusted with respect to the first gain block 110.

According to further preferred embodiments of the present invention, if the temperature measured by the first gain block 110 is below the reference range (D), it is suitably determined that the motor temperature enters the low temperature range (A), the temperature of the low temperature range (A) is suitably measured by the second gain block 120, and steps S241 to S243 are repeated.

In other further embodiments, if the temperature measured by the first gain block 110 is beyond the reference range (D), it is suitably determined that the motor temperature is within the high temperature range (C), and steps S250 to S253 are repeated.

Accordingly, the entire temperature range of the motor to be measured is suitably divided into the high and low temperature ranges (C and A) and the hardware gain circuit is suitably divided into the first and second gain blocks 110 and 120 such that each of the first and second gain blocks 110 and 120 measures the temperature of the corresponding temperature range. Preferably, according to further preferred embodiments of the present invention, if the temperature measured by the first gain block 110 reaches the intermediate range (B), in which the high and low temperature range (C and A) overlap each other, the offset and gain of the second gain block 120 are suitably corrected with respect to the first gain block 110 in a software manner, and if the temperature measured by the second gain block 120 reaches the intermediate range (B), the offset and gain of the first gain block 121 are suitably corrected with respect to the second gain block 120 in a software manner, thereby extending the linearity within the required measurement range with the use of the single temperature sensor 11, and improving the operational reliability.

As described herein, a method for measuring the temperature of a motor for a hybrid electric vehicle in accordance with the present invention provides a number of advantages, for example, but not limited only to, with the present invention it is possible to improve the reliability during the measurement of the motor temperature by dividing the hard ware gain circuit into two gain blocks in a hybrid system.

Further, since it is not necessary to provide two types of temperature sensors to suitably measure the entire temperature range of the motor, it is possible to suitably reduce the manufacturing cost and the number of components to be replaced in the event of failure.

Further, according to preferred embodiments of the present invention described herein, it is possible to extend the measurement range of the motor temperature and suitably improve the linearity of the temperature sensor by adjusting the offset of the first gain block during the temperature measurement at a low temperature range and adjusting the offset of the second gain block during the temperature measurement at a high temperature range;

Further, according to further preferred embodiments it is possible to reduce the deviation of the hybrid control performance by extending the measurement range to a high temperature range by means of the first gain block during the temperature measurement at a low temperature range and extending the measurement range to a low temperature range by means of the second gain block during the temperature measurement at a high temperature range; and Further, according to the present invention as described herein, the extended measurement range of the motor temperature improves the operational performance, and the use of the single temperature sensor improves the service performance and reduces the client's complaint.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for measuring the temperature of a motor for a hybrid electric vehicle, the method comprising:

measuring the temperature of a motor by first and second gain blocks;

determining whether the measured temperature of the motor is within a low temperature range or a high temperature range;

measuring the temperature of the low temperature range by the second gain block if the a starting point of the measured temperature of the motor is within the low temperature range, and measuring the temperature of the high temperature range by the first gain block if the starting point of the measured temperature of the motor is within the high temperature range;

determining whether the temperature of the motor reaches an intermediate range, in which low and high temperature ranges overlap each other;

correcting a deviation of the first gain block with respect to the second gain block or a deviation of the second gain block with respect to the first gain block when the temperature of the motor reaches the intermediate range;

comparing the temperature of the motor with a temperature of a reference range in the intermediate range; and when the temperature of the motor is beyond the temperature of the reference range, measuring a temperature of a low temperature range by the second gain block when the temperature of the motor is below the temperature of the reference range.

2. The method of claim 1, further comprising:

determining whether the starting point of the temperature of the motor is within an intermediate range, in which the low and high temperature ranges overlap each other;

determining whether the temperature of the motor is near the low temperature range with respect to the temperature a reference range in the intermediate range if the starting point of the temperature of the motor is within the intermediate range; and measuring the temperature of the low temperature range by the second gain block if the starting point of the temperature of the motor is near the low temperature range with respect to the temperature of the reference range, and measuring the temperature of the high temperature range by the first gain block if the temperature of the motor is near the high temperature range with respect to the temperature of the reference range.

* * * * *